April 1, 1958 S. T. JARVIS 2,828,866
CLOTHES REEL
Filed Aug. 6, 1954 4 Sheets-Sheet 1
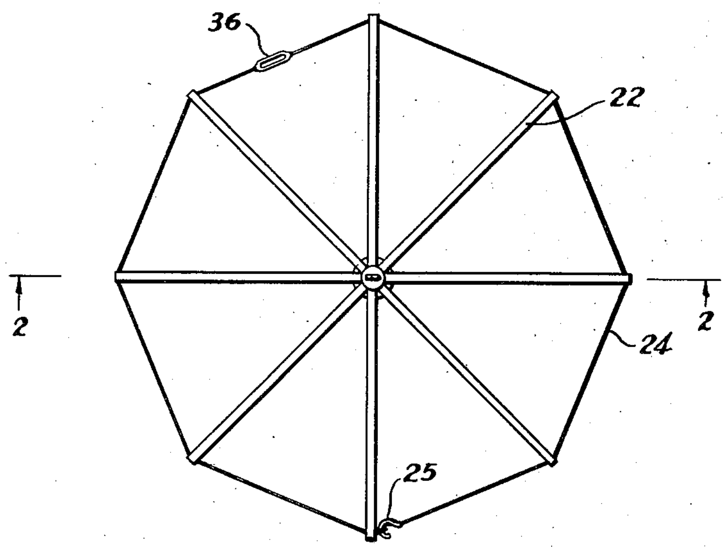
Fig. 1.
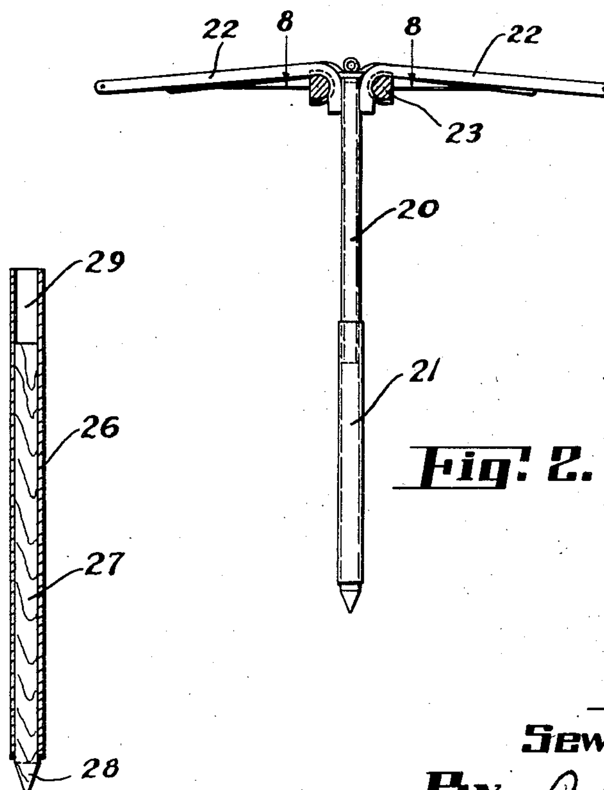
Fig. 2.
Fig. 3.
Inventor
Seward T. Jarvis
By Arthur G. Thomson
Attorney April 1, 1958 S. T. JARVIS 2,828,866
CLOTHES REEL
Filed Aug. 6, 1954 4 Sheets-Sheet 2
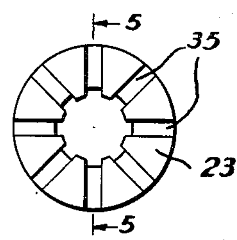
Fig. 4.
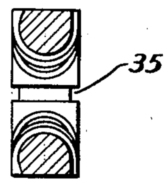
Fig. 5.
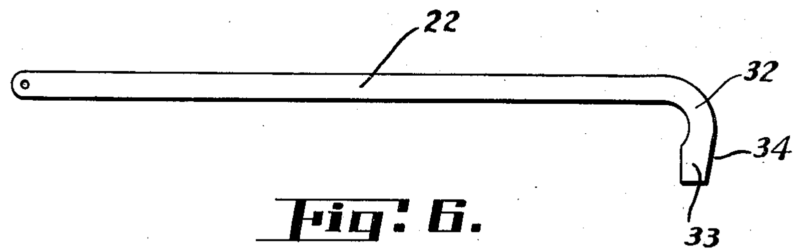
Fig. 6.
Fig. 7.
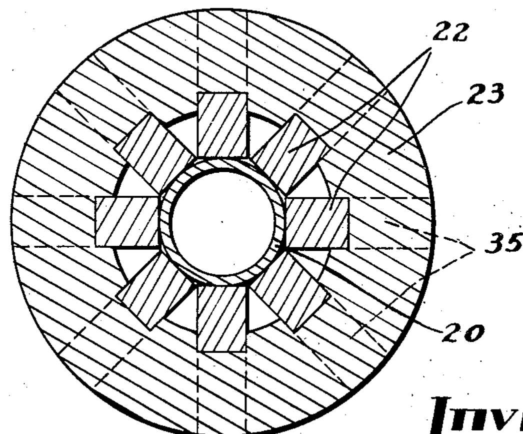
Fig. 8.
Inventor
Seward T. Jarvis
By Austin D. Thomason
Attorney April 1, 1958 S. T. JARVIS 2,828,866

CLOTHES REEL

Filed Aug. 6, 1954 4 Sheets-Sheet 3

Inventor
Seward T. Jarvis

By Arthur D. Thomson
Attorney

April 1, 1958
S. T. JARVIS
2,828,866
CLOTHES REEL
Filed Aug. 6, 1954
4 Sheets-Sheet 4
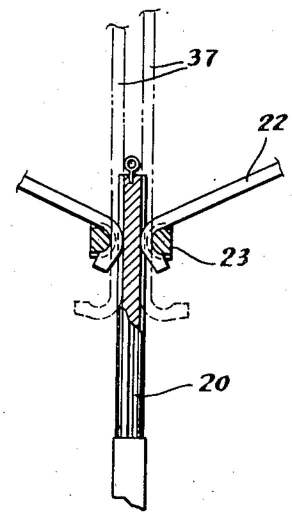
Fig. 11.
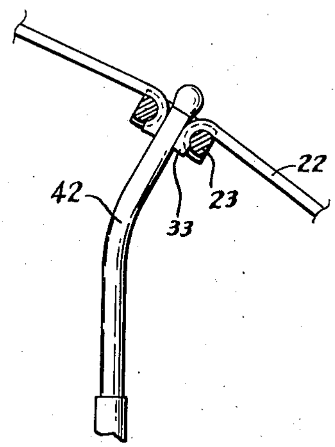
Fig. 13.
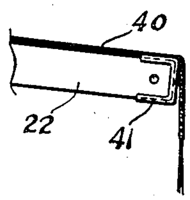
Fig. 12.
43
20a
Fig. 14.
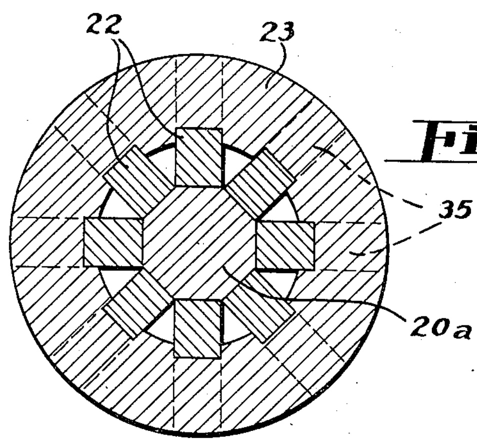
Fig. 15.
Inventor
Seward T. Jarvis
By Arthur D. Thomson
Attorney

United States Patent Office 2,828,866
Patented Apr. 1, 1958

2,828,866

CLOTHES REEL

Seward T. Jarvis, Arlington, Mass.

Application August 6, 1954, Serial No. 448,204
4 Claims. (Cl. 211—173)

This invention relates to clothes reels, more particularly to reels of the folding portable type, and further pertains to a reel which may serve as an umbrella frame when not in use for drying clothes. The chief object of the invention is to produce a reel which can be set up and collapsed with a minimum of effort, which is inexpensive to manufacture, which is strong and durable, and which presents an attractive appearance so that it is not objectionable when mounted in any convenient location near a house. Another object is to produce a reel which can be quickly converted into a sunshade or beach umbrella, and which can be easily adjusted to the desired height.

The reel consists in general of a center post which can be driven into the ground and supports a number of outwardly extending arms. The arms are clamped to the post when in the erected position by a very simple clamping device which depends upon friction and tension so that no screws or tools are required for setting up the reel. The clamping device will secure the arms at any desired height on the post. The arms extend outward at regularly spaced intervals and form a frame to which a covering made of triangular panels similar to a conventional umbrella covering may be applied.

In the drawings illustrating the invention:

Fig. 1 is a plan view of the reel in its erected position;

Fig. 2 is a cross-section taken along line 2—2 of Fig. 1;

Fig. 3 is an enlarged vertical cross-section of the lower part of the central post;

Fig. 4 is an enlarged plan view of the clamping ring;

Fig. 5 is a cross-section taken along line 5—5 of Fig. 4;

Fig. 6 is an enlarged side view of one of the arms;

Fig. 7 is an enlarged vertical cross-section of the upper part of the post;

Fig. 8 is an enlarged horizontal cross-section taken along line 8—8 of Fig. 2;

Fig. 11 is a detail side view, partly broken away, showing one of the arms in the process of being folded;

Fig. 12 is a detail of one of the ends of the arms showing the manner of attaching an umbrella cover;

Fig. 13 is a side view, partly broken away, of another modification of the supporting post;

Fig. 14 is a side view, partly broken away, of another modification of the supporting post; and Fig. 15 is a section similar to Fig. 7, showing the ring and arms assembled on the post of Fig. 14.

Figure 9:
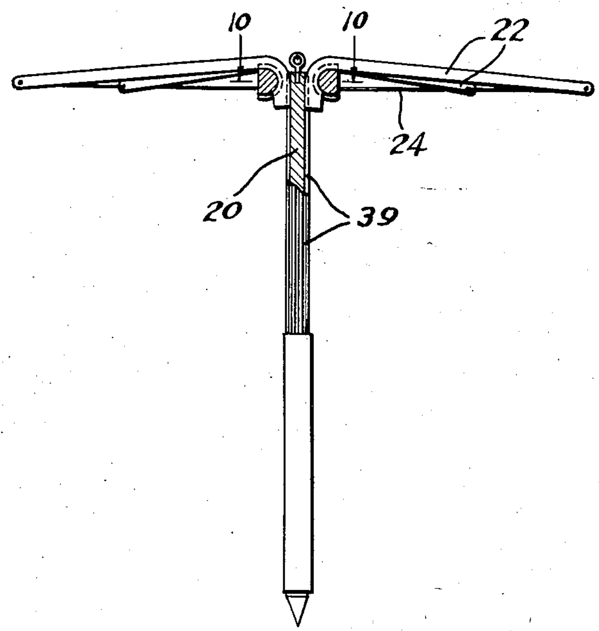
Fig. 9 is a vertical cross-section similar to Fig. 2 showing a modification of the supporting post.

As shown in Figs. 1 to 7, the center post consists of two sections, an upper section 20 and a lower section 21. A number of outwardly extending arms 22 are mounted on the upper end of section 20 of the post and are secured in place by a clamping ring 23 and a cable 24 in a manner to be subsequently described.

The lower section 21 of the post consists of a piece of tubing 26, preferably aluminum, having a wooden stake 27 driven in so as to fit tightly. The stake has a pointed end 28 projecting from the lower end of the tubing, which may be driven into the ground. The upper end of the stake is spaced somewhat below the upper end of the tubing, leaving a recess 29 in to which the upper section 20 is fitted.

As shown in Fig. 6, section 20 is circular in shape and consists of a piece of tubing, but may be made of solid rod. This section preferably has a cap 30 attached to the upper end supporting a ring 31 by which the reel assembly may be carried. The outwardly extending arms 22, as shown in Fig. 6, have a hooked portion 32 which is curved on a radius and a downwardly projecting end portion 33. The latter has a sloping back surface 34 which is at an acute angle with respect to the main body of the arm. The clamping ring shown in Figs. 4 and 5 has a number of radial grooves 35 which are of a suitable width to accommodate the arms 22, the latter being preferably rectangular or square in cross-section.

As shown in Fig. 8, the ring when assembled on to the post holds a number of the arms 22 disposed in the grooves 35. The number is here shown as 8, but more or fewer arms may be used. The internal diameter of the ring is such as to allow just enough space between the ring and the post for the curved portions 32 of the arms, and the grooves are preferably spaced so that the arms touch each other all around the post and are thus locked against sideways movement.

The manner of locking the arms to the post is shown in Fig. 2. It will be noted that the sloping back surfaces 34 of the downturned ends 33 of the arms are aligned with the post when the arms are sloping downward. A cable 24 is run through the outer ends of all the arms. This cable is preferably drawn tight when the arms are swung downward past the horizontal position and thus serves to tighten the back surfaces 34 against the upper section 20 of the post and provide a friction lock. The cable may be elastic so as to yield sufficiently to allow the arms to be pushed up past the horizontal, or an inelastic cable, preferably made of non-corrosive metal, may be used. In the latter case the cable is provided with a hook and eye connection 25 at one of the arms so that the cable may be loosened for folding the reel. The cable might also be provided with a turn buckle 36 for tightening so as to obtain the desired friction.

When it is desired to fold the reel the cable 24 is loosened and the arms drawn up past the horizontal position, as shown in Fig. 11. When the friction lock is thus loosened the whole arm assembly slides down the post to fold, and the arms may be rotated into alignment with the post, as indicated by the dotted lines 37. The height of the arm assembly can be adjusted by releasing the lock in the same manner and sliding the assembly to any desired position.

Figure 10:
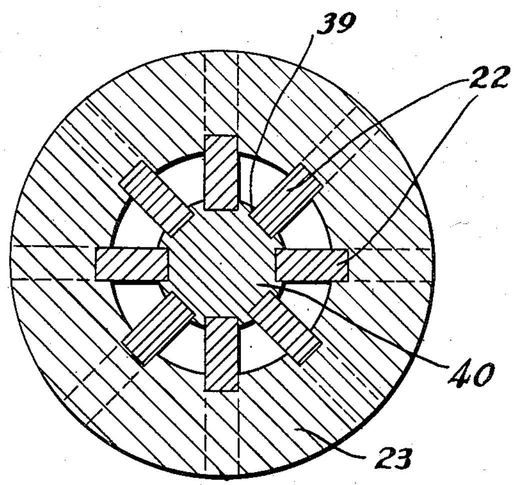
Fig. 10 is an enlarged cross-section taken along line 10—10 of Fig. 9.

In the modification of Figs. 9 and 10 the upper section 20 of the post is replaced by a solid post 40 which has a number of vertical grooves 39 in which the arms are received. The arms in this case need not touch around the post as they are locked in the grooves. The clamping ring and the cable lock the arm assembly against sliding up and down when the arms are erected, as previously described.

In the modification of Fig. 13 the upper post section has a curved portion 42 near the top so that the reel, when used as an umbrella frame, can be tilted. The ring and arm assembly locks to the post, as previously described at any desired point along the post. When the assembly is placed above or at any intermediate point of the curved portion the arm assembly is tilted to a greater or less degree. When it is desired to have the arm assembly horizontal, as may be preferable for use as a clothes reel, the ring is moved to a point below the curved portion.

In Figs. 14 and 15 the upper post section 20*a* is made of octagonal stock, with a reduced round lower end 43 which fits inside the bottom post section 21. In this case, the stake 27 need not extend so far up the bottom post section as the lower edge of the octagonal part of the upper post section acts as a stop. The ring and arm assembly locks to the octagonal part of the upper post section as previously described, the surfaces 34 of the arms lying flat against the octagonal sides as shown in Fig. 15. This form of post, although somewhat more expensive than the tubular form, is preferred, as the flat surfaces provide a much larger contact area for the arms, and the locking friction is therefore greater.

To convert the reel into an umbrella, a cover 40, of canvas or other suitable material, is placed over the erected arm assembly. It is understood that the cover may be made of triangular panels to fit the frame in the manner of a conventional umbrella. The cover is preferably secured by clips 41 which fit over and around the outer ends of each of the arms.

The whole reel can be put up and taken down in a few minutes without tools of any kind, so that it can be readily moved from place to place. When not in use for drying clothes it can be quickly made into an umbrella by putting on the cover. It is thus attractive in appearance as well as serving a double function. The fact that the arm assembly can be locked at any position along the upper post section, adds greatly to the usefulness of the device for either purpose, as the height can be adjusted to suit the user's convenience.

What is claimed is:

1. A clothes reel comprising a circular post, a ring surrounding said post, a number of arms having hook shaped end portions disposed between the ring and the post, the arms each being swingable about the ring to a folded position parallel to the post, or to a position extending outwardly from the post, and said end portions each having side edges, each side edge engaging a side each of the adjoining arm to lock the arms against sidewise displacement, said end portions having surfaces adapted to frictionally engage the post when the arms are in the extended position and lock the arms and ring assembly against longitudinal displacement on the post.

2. A clothes reel comprising a post having longitudinal grooves, a ring surrounding the post and having internal grooves aligned with those of the post, a number of arms each having a hook shaped end portion disposed in aligned pairs of the post and ring grooves, said arms each being swingable about the ring to a folded position parallel to the post, or to a position extending outwardly from the post, and the end portions having surfaces adapted to frictionally engage the grooves of the post when the arms are in the extended position to lock the arm and ring assembly against longitudinal displacement on the post.

3. A clothes reel comprising a central post of polygonal cross-section with a number of flat sides, a ring surrounding the post, and a number of arms, one disposed to extend outward from each of said sides, having hook shaped end portions passing around the ring and disposed between the ring and the post, the arms each being swingable about said ring to a folded position parallel to the post or to a position extending outwardly from the post, and said end portions each having a flat surface adapted to frictionally engage a substantial area of one of said flat sides, when the arms are in the latter position, to lock the arm and ring assembly to the post.

4. A clothes reel comprising a central post, a ring surrounding said post, said ring having internal, axially disposed groove, a number of arms having hook-shaped end portions engaged in the grooves in the ring and disposed between the ring and the post, said arms each being swingable about the ring to a position subtantially aligned with the post or to a position to extend outward from the post, said end portions having surfaces frictionally engaging the post in the latter position to lock the arm and ring assembly in place.

References Cited in the file of this patent

UNITED STATES PATENTS

| | | |
|---|---|---|
| 284,090 | Tingle | Aug. 28, 1883 |
| 606,401 | Williston | June 28, 1898 |
| 1,042,262 | Pelletier | Oct. 22, 1912 |
| 1,570,657 | White et al. | Jan. 26, 1926 |
| 1,729,395 | Mandel | Sept. 24, 1929 |
| 1,747,951 | Reichert | Feb. 18, 1930 |
| 2,616,570 | Griffin | Nov. 4, 1952 |
| 2,616,571 | Griffin | Nov. 4, 1952 |
| 2,661,849 | Spalding | Dec. 8, 1953 |

FOREIGN PATENTS

| | | |
|---|---|---|
| 121,400 | Germany | July 24, 1900 |